(12) United States Patent
Bauman et al.

(10) Patent No.: US 6,179,297 B1
(45) Date of Patent: Jan. 30, 2001

(54) SEAL

(75) Inventors: Walter Douglas Bauman, Myrtle Beach, SC (US); James B. Chamberlin, Charlotte, NC (US); Archie L. Evans, Aynor, SC (US); Mark S. Jeffries; Jack R. Roach, both of Florence, SC (US)

(73) Assignee: AVM, Inc., Marion, SC (US)

(*) Notice: Under 35 U.S.C. 154(b), the term of this patent shall be extended for 0 days.

(21) Appl. No.: 09/257,333

(22) Filed: Feb. 25, 1999

Related U.S. Application Data

(63) Continuation-in-part of application No. 08/730,225, filed on Oct. 15, 1996, now Pat. No. 5,921,556, and a continuation-in-part of application No. 08/726,124, filed on Oct. 4, 1996, now Pat. No. 5,895,053, and a continuation-in-part of application No. 08/720,954, filed on Oct. 4, 1996, now Pat. No. 5,921,557.

(51) Int. Cl.[7] ................. F16J 9/20; F16J 9/28; F16J 15/32
(52) U.S. Cl. ............ 277/437; 277/566; 277/568
(58) Field of Search ............... 277/437, 566, 277/568, 584, 585, 589, 910, 946, 649, 651; 267/64.1; 188/322.17

(56) References Cited

U.S. PATENT DOCUMENTS

| | | | |
|---|---|---|---|
| 2,909,398 | * | 10/1959 | Taylor . |
| 2,918,336 | | 12/1959 | Works et al. ............... 309/4 |
| 2,926,976 | * | 3/1960 | Bowerman et al. . |
| 3,189,360 | * | 6/1965 | Haberkorn . |
| 3,472,523 | * | 10/1969 | Rentschler et al. . |
| 3,521,893 | * | 7/1970 | Josephson . |
| 4,693,343 | * | 9/1987 | Boyd . |
| 4,865,170 | * | 9/1989 | Ciepichal . |
| 4,921,225 | * | 5/1990 | Ludwig ............... 188/322.17 |
| 5,048,647 | * | 9/1991 | Fuhrmann et al. . |
| 5,275,387 | * | 1/1994 | Cotter et al. . |
| 5,480,163 | | 1/1996 | Miser et al. . |
| 5,735,371 | | 4/1998 | Jobelius et al. ............... 188/276 |
| 6,036,192 | * | 3/2000 | Dietle et al. . |

* cited by examiner

Primary Examiner—Anthony Knight
Assistant Examiner—John L. Beres
(74) Attorney, Agent, or Firm—McAndrews Held & Malloy, Ltd.

(57) ABSTRACT

A seal that is particularly suitable for use in a gas spring (and other high pressure hydraulic and pneumatic sealing applications) and that minimizes leakage of relatively high pressure gas and lubricating oil from the rod end of the gas spring. The generally annular seal body includes a radially inwardly facing surface, force directing lobes and either a plastic wiper insert or a wiper lobe that are designed for minimizing the leakage of oil between the radially inwardly facing surface of the seal body and the adjacent, radially outwardly facing surface of the gas spring's piston rod, and that include a corner edge that projects radially inwardly beyond the plane of the seal body's radially inwardly facing surface. When the seal body is compressed for use in a gas spring and is thus subjected to the high-pressure gas, the induced stresses in the seal body result in the corner edge being forced against the adjacent surface of the piston rod to effectively prevent the leaking of oil therebetween. The permeation of gas axially through the seal body is minimized by the inclusion of a co-molded metal plate in the seal body adjacent to the rod end of the seal body.

15 Claims, 3 Drawing Sheets

SEAL

CROSS REFERENCE TO RELATED APPLICATIONS

This is a continuation in part of U.S. application Ser. No. 08/726,124, filed Oct. 4, 1996 now U.S. Pat. No. 5,895,053; U.S. application Ser. No. 08/720,954, filed Oct. 4, 1996 now U.S. Pat. No. 5,921,557; and U.S. application Ser. No. 08/730,225, filed Oct. 15, 1996 now U.S. Pat. No. 5,921,556. Each of the foregoing are co-pending applications and is hereby incorporated by reference herein in its entirety so as to provide continuity of disclosure.

BACKGROUND OF THE INVENTION

The present invention relates to gas and oil seals that are particularly adapted for use in gas springs and in other high pressure hydraulic and pneumatic sealing applications, which include an annularly spaced, relatively movable piston rod and cylinder and which contain relatively high pressure gas and lubricating oil (hereinafter collectively referred to as "gas springs"). The improved seal of the present invention advantageously minimizes the leakage of relatively high pressure gas and lubricating oil between an annularly spaced, axially relatively movable cylinder and piston rod, and more particularly, from the rod end of the cylinder.

The basic structure and theory of operation of gas springs has long been known. Gas springs include a piston and a cylinder, both having a relatively small diameter, usually under two inches. The piston is designed to move relatively within and with respect to the cylinder and is connected with one end of a piston rod that extends out of the normally sealed, rod end of the cylinder. The other end of the piston rod is usually connected with a device upon which the gas spring exerts force when the spring is actuated. The other, closed end of the cylinder is charged with a relatively high pressured gas, generally nitrogen, and usually at a pressure usually between 500–3,000 psi. Lubricating oil is normally also introduced into the closed end of the cylinder at the time of the gas spring's manufacture.

To be commercially acceptable, it has long been recognized by those in the gas spring art that a gas spring must include a seal that minimizes the leakage of the high pressure gas—and in most instances, the lubricating oil—from the rod end of the cylinder. This gas spring seal must effectively seal around the piston rod as well as between the piston rod and the cylinder, or more specifically, the inner cylinder wall.

For this purpose, previously available gas springs generally used so-called "lip" seals or so-called "quad" seals before our invention. Examples of such quad seals are disclosed in U.S. Pat. Nos. 3,550,990 and 4,693,343. Such quad seals are normally employed in combination with a metal bushing member and a plastic, usually polytetrafluoroethane ("PTFE"), washer. The washer is used to prevent the extrusion or "nibbling" of the seal as disclosed in the latter patent.

Over the past decade or so, gas springs have been increasingly used in automotive vehicles in lieu of mechanical springs. For example, gas springs are now commonly used to hold open trunk hoods, deck lids, hatch doors (in hatch back type vehicles) and the rear doors or gates or minivans and sport utility vehicles.

The design and manufacture of gas springs for automotive usages pose unique and special problems for gas springs manufacturers, particularly in view of the large numbers of gas springs that must be manufactured to exacting specifications by mass production techniques and machinery. Additionally, and increasingly within the past several years, enormous pressures have been exerted by automotive manufacturers to have gas spring manufacturers reduce their manufacturing costs while, at the same time, enhance the quality and extend the effective life of their gas springs.

One of the problems confronting gas spring manufacturers is the range of environmental conditions under which the gas springs are used and their sometimes irregular usage. For instance, gas springs are expected to function satisfactorily in the heat of summer and in the cold of winter even when, for example, a trunk hood may be opened by an elderly person who only infrequently uses his or her vehicle.

Another problem long facing gas spring manufacturers is the reduction of the high static frictional ("stiction") or break-a-way force, that is, the force required to "unstick" the seal when the initial relative movement between the cylinder and the piston rod occurs. This problem is significant in gas springs and hydraulic/pneumatic suspension applications where it is important to minimize high initializing force spikes and resulting seal instability due to long delays between spring activation cycles. Such delays are especially common in gas springs employed in automotive vehicles.

Further, dynamic friction may contribute to accelerated seal failures during high frequency low amplitude cycling (typically 3 mm×20 Hz). This is associated with "gate dance" which occurs when the vehicle encounters irregular road surface conditions.

To enable gas springs to function as intended in an automotive environment, the gas pressure of the spring (that is, the output force exerted by the spring) must be maintained substantially constant throughout the anticipated life of the gas spring. It is imperative then that leakage of gas from the gas spring cylinder be minimized, both when the gas spring is being used (that is, when the gas spring is in a dynamic state or mode) and when the gas spring is not being used (that is, when it is static). No one is "happy" when a trunk lid fails to remain in an open position even if the vehicle is over five years old.

Leakage of the lubricating oil from the gas springs cylinders has also been becoming an increasingly serious problem as gas springs are more often used in passenger occupying parts of vehicles, such as vans and hatch backs. No one likes to find oil "spots" in their vehicles, particularly when the spots are where children or pets are likely to be. Acceptable gas spring seals must now minimize both dynamic and static oil losses.

Only a decade or so ago, the standards for gas springs, set by automotive manufacturers, were losses of less than a 5% output force/gas charge and 3.0 cc. oil per 10,000 cycles. Losses of less than a 5% output force/gas charge and 0.3 cc. oil per 50,000 cycles are now the targeted standards. Automotive manufacturer would like in the future to extend the standards to 100,000 cycles as the life expectancy of automotive vehicles and their components is extended. Additionally, a ten year effective life—as opposite to the heretofore normal five year effective life—for gas springs has been set as a goal by the automotive manufacturers. In the past, the permeation of gas through and around the gas spring seals has tended to limit the effective lives of gas springs. More particularly, it is known that gas molecules will, over time, permeate axially through a seal body in a gas spring so as to reduce the effective life of the gas spring even the seal's design otherwise minimizes gas leakage around the seal.

Those skilled in the gas spring art have recognized that currently available gas spring seals, and even the better performing quad seals, have inherent weakness or limitations. For instance, the current, commercially available quad seals remain prone to relatively high static and dynamic oil losses and has high "stiction" or static break-away forces.

It has been a longstanding goal in this art to overcome the above described problems and weaknesses, to extend the effective life for gas spring seals, and to reduce significantly the cost of manufacturing gas springs even further.

BRIEF SUMMARY OF THE INVENTION

The improved gas spring seal of the present invention employs a unique, materially hybrid, non-symmetrical energized seal body and "wiper" design that controls the distinct sealing requirements of high pressure gas and oil in a novel manner and that minimizes the dynamic and static leakage of the gas and oil out of the gas spring cylinder to a much greater extent than commercially available quad seals. More specifically, the improved seal of the present invention performs beyond the currently targeted standards of losses of less than 5% output force/gas charge and 0.3 cc oil per 50,000 cycles. Moreover, tests indicate that the improved seal advantageously reduces losses to less than 3.0% output force/gas charge per 100,000 cycles (where a 30.0% loss would be typical of current seals) and to less than 0.1 cc oil per 100,000 cycles (where a 10.0 cc loss per 100,000 cycles would be typical of current seals). Additionally, the improved seal is capable of reducing static friction ("stiction") or break-a-way forces to values approaching zero; of handling extreme pressure differentials exceeding 200 atmospheres; and of reducing friction and permeation leakage as compared to commercially available quad seals. In this latter regard, the improved seal of the present invention is capable of increasing the effective life of gas springs so as to enable the automotive manufacturer's ten-year life goal to be achieved.

Further, and as compared with commercially available rod end bushing assemblies, which utilize quad seals and separate washers as components, the improved seals of the present invention permits significant manufacturing and assembly economies. In some respects, the improved seals, in effect, integrally combine quad seal and washer concepts with novel structures that minimizes gas permeation through the seal body and that can be co-molded with the seal body. The novel structures of the present seals also provide improved sealing against oil leakage between the seal body and this piston rod. Certified cell automation and zero defect quality strategies may be utilized in manufacturing the improved seals. The designs of the improved seals are also compatible with parametric scaling techniques that allow rapid and facile development of alternate ID/OD designs as market opportunities present themselves.

The improved seals of the present invention retains the fault tolerant redundancy of prior quad seal designs, but now also includes geometrically optimized sealing surfaces that are able to bridge both rod and cylinder wall imperfections. The incorporation of the unique, integrated and energized wiper structures further prevents external contaminants (such as road grits and salts) from entering and compromising the gas spring system. Further the energizing design of the improved seals enables both the wiper structure and the seal body to replenish or "heal" damaged or worn areas.

Accordingly, it is a principal object of the present invention to provide an enhanced and improved gas spring by employing a novel and improved piston rod and cylinder seal so as to minimize the leakage of the gas and oil from the rod end of the gas spring.

A related object of the present invention is to provide an improved seal and a gas spring having the improved seal; where the improved gas spring has an annularly spaced, axially relatively movable cylinder and piston rod; where the piston rod extends out of rod end of the cylinder; and where the improved seal will be disposed for sealing between the relatively movable cylinder and piston rod so as to minimize the leakage of the relatively high pressure gas and the lubricating oil out of the rod end of the gas spring.

Another object of the present invention is to provide an improved gas spring and an improved seal for gas springs, as described, where the improved seal has a generally annular, non-symmetrical seal body that is made of a molded elastomeric material, that has a longitudinal axis which is adapted to be disposed generally parallel to the axis of movement of the piston rod and cylinder, and that includes: a first, generally radially inwardly facing surface, which is adapted to be disposed about and in sealing contact with a radially outwardly facing surface on the piston rod of the gas spring; a second, generally radially outwardly facing surface, which is adapted to be disposed within and in sealing contact with a radially inwardly facing surface on the cylinder of the gas spring; a third, generally axial facing surface, which is adapted to face the closed end of the gas spring cylinder and which is adapted to be exposed to the relatively high pressure gas in the gas spring cylinder; and a fourth generally axial facing surface which is adapted to face the rod end of the gas spring cylinder and which is adapted to be exposed to a relatively lower pressure. A related object of the present invention is to provide an improved gas spring and an improved seal for gas springs, as desbribed, where the seal body also has a first generally annular enhanced force directing and sealing lobe that is disposed at the intersection of the first and third surfaces; a second generally annular enhanced force directing and sealing lobe that is disposed at the intersection of the second and third surfaces; a third generally annular enhanced force directing and sealing lobe that is disposed adjacent to the intersection of the second and fourth surfaces; a fourth generally annular enhanced forced directing and sealing lobe that is disposed in the second surface between the second lobe and third lobe; and a fifth generally annular enhanced force directing and sealing lobe in the first surface that is disposed between the planes of the third and fourth surfaces; and a generally annular portion that is in the first surface between the fifth lobe and the fourth axial surface and that is adapted to serve as a reservoir for oil, which may tend to migrate from the closed end of the gas spring cylinder along the first surface of the seal body rod when the seal body is disposed about and in sealing contact with a radially outwardly facing surface on the gas spring piston rod and is adapted to be disposed within and in sealing contact with the radially inwardly facing surface on the gas spring cylinder. A further related object of the present invention is to provide an improved gas spring and an improved seal for, gas springs, as described, where the seal body also includes means for minimizing leakage of oil between the first surface of the seal body and a radially outwardly facing surface on the gas spring piston rod, with the oil leakage minimizing means being disposed between the generally annular portion and the fourth surface and including a first edge that projects radially inwardly beyond the plane of the first surface of the seal body; where the first edge of the oil leakage minimizing means is adjacent to the generally annular portion; where the first lobe and the fifth lobe project radially inwardly; where the second, third and fourth lobes project radially outwardly; where the first, second, third, fourth and fifth lobes have preselected sizes and shapes for inducing and directing a force in a preselected direction in the seal body when the seal body is disposed about and is in sealing contact with a radially outwardly facing surface on the gas spring piston rod and is disposed within and is in sealing contact with a radially inwardly facing surface on the gas spring cylinder; and where the preselected sizes and shapes of the first, second, third, fourth and fifth lobes, together with the compression of the seal between a gas spring cylinder and piston rod and the gas loading on the seal body, causes net resultant forces to act on the seal body such that the first edge of the oil leakage minimizing means will bear against a radially outwardly facing surface of the gas spring piston rod so as to minimize leakage of oil between the first edge and the radially outwardly facing surface of the piston rod.

Still another object of the present invention is to provide an improved seal and a gas spring with an improved seal, as described, where the seal body has a generally annular recess opening in the first surface adjacent to the intersection of the planes of the first and fourth surfaces; and where the oil leakage minimize means includes a relatively flowable plastic, generally annular insert that is disposed in the recess, with the insert having a generally radially outwardly facing surface, having a first axial facing surface that faces the third axial surface of the seal body, having a radially inwardly facing surface, and having a first corner edge, which is defined by the intersection of the planes of the first axial surface and the inwardly facing surface of the insert and which is disposed radially inwardly beyond the plane of the first surface of the seal body.

Yet another object of the present invention is to provide an improved seal and gas spring with an improved seal, as described, where the oil leakage minimizing means includes a sixth, generally annular sealing lobe that is in the first surface of the seal body between the annular portion and the plane of the fourth surface of the seal body; and where the sixth lobe includes an axially extending portion having a radially inwardly facing surface, a first generally axially facing surface that faces toward the third surface of the seal body, and a first corner edge that is defined by the intersection of the planes of the first axial surface and the inwardly facing surface of the sixth lobe; and wherein the first corner edge of the sixth lobe is disposed radially inwardly beyond the plane of the first surface of the seal body.

Still yet another object of the present invention is to provide an improved seal and gas spring with an improved seal, as described, where an annular metal plate is disposed in the seal body, adjacent to the rod end of the seal body so as to minimize the permeation of gas axially through the seal body. A related object of the present invention is the annular dimension, in a radial plane, of the metal plate is substantially the same as, but slightly less than the annular dimension, in the radial plane, of the seal body; where the plane of the metal plate is generally parallel to a radial plane through the seal body; and where the metal plate is co-molded with the seal body and is disposed between the fourth surface of the seal body and the radial plane of the insert.

Further advantages, objects, and benefits of the present invention will become apparent from the following description of the preferred embodiments of the present invention, made in connection with the drawings described below.

DETAILED DESCRIPTION OF THE PREFERRED EMBODIMENTS OF THE INVENTION

Figure 1:
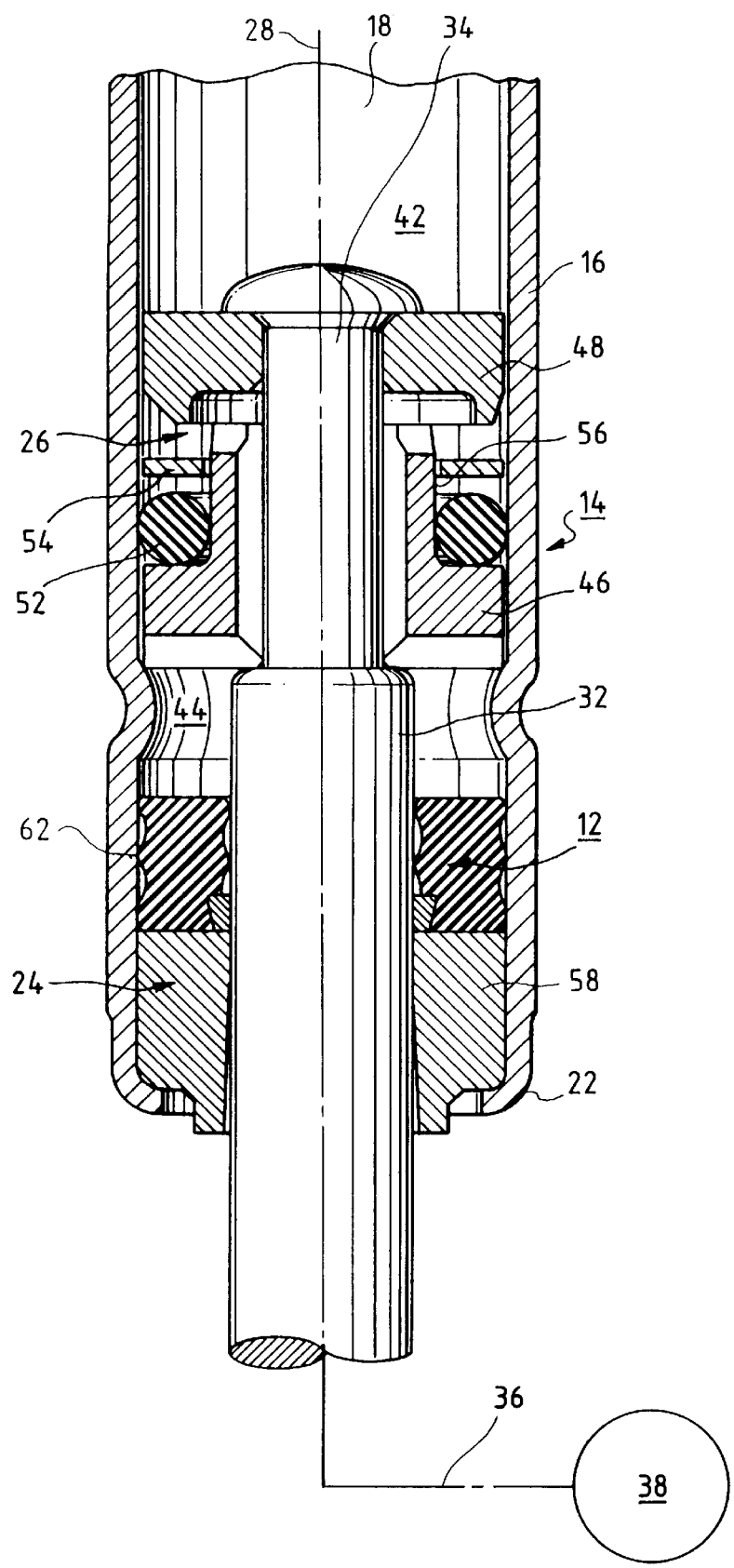
FIG. 1 is a partial, axial cross-sectional view of an improved gas spring, with parts thereof broken away, showing an improved seal of the present invention disposed, for illustrative purposes, in an unstressed state in the gas spring.

Referring now to FIG. 1, one of the preferred embodiment of the improved seal 12 of the present invention is illustrated as it is disposed, in an uncompressed state, in a gas spring 14. Except for the seal 12, the gas spring 14 is otherwise of conventional design and construction.

More specifically, the gas spring 14 includes a cylinder 16 that has a closed end 18 and a rod end 22. A bushing and seal assembly 24 normally closes the rod end 22.

A piston assembly 26 is disposed within the cylinder 16 and is adapted to move relatively, with respect to the cylinder 16, along a longitudinal axis of movement 28, which axis is coaxial with the longitudinal axes of the cylinder and the piston assembly. A piston rod 32 is connected, in a conventional manner, at its reduced diameter end 34, with the piston assembly 26. The longitudinal axis of the rod 32 is also co-axial with the axis 28.

The piston rod 32 extends through the bushing and seal assembly 24 and out of the rod end 22 of the cylinder 16. The rod's distal end 36 is connected with a conventional device, shown at 38, upon which the gas spring 14 exerts force when the gas spring is actuated. Examples of such a device 38 are a trunk or deck lid, a hood of an automobile, a hatch door of hatchback type vehicle, or a rear door or gate of a minivan or sport utility vehicle. When the gas spring 14 is used with such a device 38, the other end, not shown (that is, the end adjacent the closed end 18) of the gas spring 14 would be connected, through conventional structure also now shown, with the body of the vehicle.

The interior of the cylinder 16 is divided, by the piston assembly 26, into a compression chamber 42 and an expansion chamber 44. These chambers 42 and 44 are charged, during the gas spring's manufacture, with a relatively high-pressure gas, usually nitrogen. As is typical for gas springs, the gas pressure would be in the 500–3,000 psi range. An amount of lubricating oil is also introduced into the cylinder 16 during manufacture to facilitate relative movement between the piston assembly 26 and the cylinder 16.

The piston assembly 16 includes a first annular member 46, which is disposed adjacent to the expansion chamber 44, a second annular member 48, which is disposed adjacent to the compression chamber 42, a conventional O-ring 52, and a steel washer 54. The first member 46 includes a central, tubular extension 56 that extends toward the second member and that is spaced radially outwardly, from the adjacent, reduced diameter end 34 of the piston rod 32 so as to define an axial gas passage therebetween. The O-ring 52 and the washer 54 are mounted on and about the extension 56 for limited relative axial movement with respect to the extension 56. The O-ring 52 serves to prevent gas and oil from passing between the first member 46 and the cylinder 16. The distal end of the extension 56 and the second member 48 have a radial gas passage defined therebetween.

Gas in the cylinder 16 is permitted to flow between the outer periphery of the second member 48 and the cylinder 16, through the radial passage between the members 46 and 48, and through the axial passage between the extension of the first member 46 and the piston rod 32. As is conventional, when the gas spring 14 is in its dynamic mode or state, gas may pass, without restriction, from the compression chamber 42 to the expansion chamber 44 through the piston assembly 26 as the piston assembly moves relatively toward the closed end 18 of the cylinder 16. However, when the piston assembly 26 moves relatively toward the rod end 22 of the cylinder 16, the O-ring 52 and the washer 54 restrict the flow from the expansion chamber 44 to the compression chamber 42.

When the gas spring 14 is in a static mode or state, the gas in the chambers 42 and 44 will readily reach pressure equilibrium. The bushing and seal assembly 24 will be exposed to full gas pressure at all times and must satisfactorily seal against gas leakage at all times to maintain the effectiveness of the gas spring.

The oil in the cylinder 16 is distributed throughout the cylinder 16. Oil tends, however, to collect adjacent to the bushing and seal assembly 24, particularly when the gas spring is disposed generally vertically, that is, with its rod end 22 down. The pressure of the gas in the expansion chamber seeks to force the oil past the bushing and seal assembly 24.

As noted, the bushing and seal assembly 24 receives the reciprocally movable piston rod 32. The assembly 24 includes a conventional, annular metal (normally brass) bushing member 58 that tightly fits about the piston rod 32 when it reciprocally moves, with respect to the cylinder 16 (that is, when the gas spring is in the its dynamic mode) and when the piston rod is not moving relative to the cylinder (that is, when the gas spring is in its static mode).

The bushing and seal assembly 24 also includes the improved seal 12 of the present invention. As noted, the seal 12 serves to minimize the leakage of gas and oil from the expansion chamber 44 out of the rod end 22 of the cylinder 16. Unlike as illustrated in FIG. 1, the seal 12 is normally disposed in a compressed state between the piston rod 32 and the cylinder 16 (or more particularly, between the inner facing surface of the wall of the cylinder).

Figure 2:
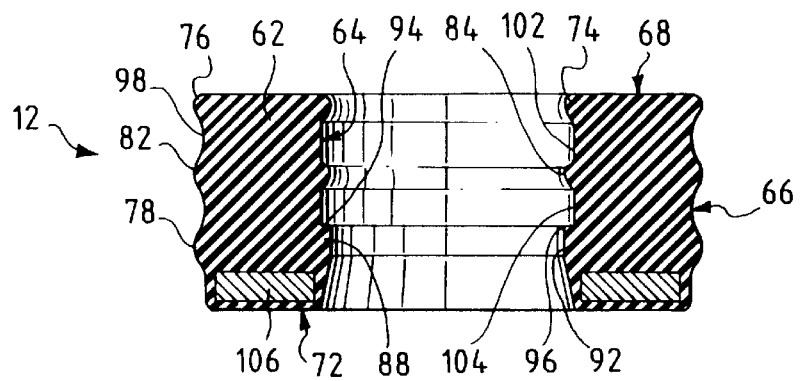
FIG. 2 is an axial cross-sectional view of one embodiment of the improved seal of the present invention.

Referring now to FIG. 2, one embodiment of the improved seal 12 is shown and includes a seal body 62 made from a conventional elastomeric material, such a rubber. The material may be the same as that used for prior quad gas spring seals. The durometer of the material should be between 60 and 90 depending on the particular application. Like the material used for other quad seals, the material used for the body 62 should have the ability to resist taking a compression set so as to avoid losing its installed pre-load. The tendency of the seal body 62 to be stretched to a relaxed state is overcome by establishing its installed preload by its OD to the cylinder's ID compression and not by relying upon tensile loading of its ID through stretching it onto the piston rod's OD. In other words, if the compression set qualities are acceptable, the installed pre-load or stress will remain stable for the life of the seal 12. Examples of materials that may be used for seal body 62 are Datwyler EP No. 452141 marketed by the Datwyler Rubber Company of Altdorf, Switzerland and Compound No. 558T marketed by Quadion Corporation, d/b/a Minnesota Rubber Co., of Minneapolis, Minn. although other compounds may also be used.

The seal 12 is generally and functionally similar to the seal 12 described in our above identified co-pending applications, and particularly application Ser. No. 08/730,225, except as noted herein. As best illustrated in FIG. 2, the body 62 has a radially inwardly facing surface 64, a radially outwardly facing 66, a first, rear axial facing surface 68 and a second, front axial facing surface 72. The seal body 62 also includes several enhanced force-directing and sealing lobes on its radially inwardly and outwardly facing surfaces 64 and 66. Specifically, a first, generally annular enhanced force-directing and sealing lobe 74 is at the intersection of the inwardly facing surface 64 and the first axial surface 68. A second similar, generally annular enhanced force-directing and sealing lobe 76 is at the intersection of the outwardly facing surface 66 and the axial surface 68. When unstressed (that is, when for example, the seal 12 is not compressed between the cylinder 16 and rod 32), both the sealing lobes 74 and 76 are generally convex in cross-sectional shape and both have radii of generally the same length.

A third, generally annular enhanced force-directing and sealing lobe 78 is in the outwardly facing surface 66 near the intersection of the outwardly facing surface 66 and the second axial facing surface 72. A fourth, generally annular enhanced force-directing and sealing lobe 82 is in the radially outwardly facing surface 66 approximately midway between the planes of the axial facing surfaces 68 and 72. Like the sealing lobes 74 and 78, the sealing lobe 82 is generally convex, in cross-section shape, when uncompressed or unstressed. The length of the radii of the lobes 78 and 82 are approximately twice that of the radii of the sealing lobes 74 and 76.

A fifth, generally annular enhanced force-directing and sealing lobe 84 is in the radially inwardly facing surface 64 approximately midway between the planes of the axially facing surfaces 68 and 72. The lobe 84 is shaped so that when compressed or stressed as when the seal 12 is in use, it also performs a wiping function with respect to the surface of the rod 32. Specifically, the lobe 84 has a generally convex cross-sectional shape.

The shapes and sizes of the lobes 74, 76, 78, 82 and 84 are preselected so that as hereinafter described, each has all have the desired force enhancing and directing characteristics required when the seal 12 is disposed for use in a gas spring.

Unlike the seal 12 disclosed in our above co-pending application Ser. No. 08/730,225, the seal 12 shown in FIGS. 1 and 2 does not include a plastic insert, like insert 94 described in that our co-pending application. Instead, a generally annular, integral, sixth wiper lobe 88 is in the radially inwardly facing surface 64 between the lobe 84 and the axial surface 72. This sixth lobe 88 includes a radially inwardly facing surface 92 and an axially facing surface 94, which faces the axial surface 68 and the lobe 84. The surface 92 slope radially outwardly to the axial surface 72. A corner edge 96 is defined by the intersection of the surfaces 92 and 94 and projects radially inwardly from the plane of the surface 64. This corner edge 96 serves the same function to the edge 108 in the plastic insert 94 described in our above co-pending application Ser. No. 08/730,225. Frankly, the difference in materials used (plastic for insert 94 and elastometer for lobe 88) results in the insert 94 providing a better oil seal. Nevertheless, the lobe 88, used with the enhanced force-directing lobes 74, 76, 78, 82 and 84, provides superior sealing, as compared with conventional quad seals, and the use of the lobe 88, reduces the cost of the seal 12 as compared with the seal in our co-pending application Ser. No. 08/730,225.

Referring to FIG. 2, the portions 98 of the outwardly facing surface 66 between the lobes 78 and 82 and between the lobes 82 and 76 are at least in part concave. These portions 86 are shaped and located so as to assist in directing the compression induced forces as hereinafter described. Similarly, the portions 102 and 104 of the inwardly facing surface 64 between the lobes 74 and 84 and between the lobe 88 and the lobe 84, respectively, are at least in part concave. In addition to assisting in directing the compression induced forces as described, the portion 104 is shaped so that when the seal 12 is in use (that is, when the seal is compressed between the cylinder 16 and rod 32), a reservoir of oil is retained in the portion 104 and between the seal body 62 and the rod 32. This reservoir or pocket of retained oil minimizes friction and helps to virtually eliminate stiction. Additionally, the portion 104 "catches" and retains contaminants that may be able to get between the seal and the rod 32.

Seal 12 also differs from the seals described in our co-pending application Ser. No. 08/730,225 in another important way. More specifically, the seal body 62 has a flat, generally annular metal plate or washer 106 co-molded in the seal body. The annular, inner and outer radial dimensions of the plate 106, in a radial plane, are substantially the same as but slightly less than the annular dimensions, in a radial plane, of the seal body 62 so that the plate is encased or encompassed within the seal body 62. The plate 106 is disposed between the axial surface 72 and the sixth lobe 88. As explained above, the plate 106 minimizes the permeation of gas molecules through the seal body 62 by forming a more impenetrable barrier. In addition, the plate 106 reduces the "nibbling" of the elastometer material in the same way the heretofore separately used plastic washers do.

The lobes 76, 78, and 82 project radially outwardly from an imaginary annular plane of the surface 66, which plane may be defined as containing the average radial dimension of the surface 66, considering the lobes 76, 78, and 82 and the portions therebetween. The lobes 74, 84 and 88 project radially inwardly from an imaginary annular plane of the surface 64, which plane may be defined as containing the average radial dimension of the surface 64, considering the sealing lobes 74, 84 and 88 and the portions 102 and 104.

As noted, the lobes 74 and 76 are generally convex in cross-sectional shape. Testing has disclosed that preferably the lobes 74 and 76 should preferably have the same radius (for their convex curvatures) and suggests that that radii should be less than approximately 0.019 inches. In production, the radii of the lobes may be reduced to a nominal 0.012 inch radius. When the radii of the lobes exceeds 0.019 inches, tests have indicated that some oil seepage may occur. Using sealing lobes having such radii assures adequate localized stress so as to shear oil from the OD of the piston rod 32 under both static and dynamic conditions.

Testing has also indicated that the first and second axial surfaces 68 and 72 should preferably be generally flat or slightly crowned, but not concave as in the prior quad seals. As such and when unstressed, the planes of the axial surfaces 68 and 72 are generally perpendicular to the seal's longitudinal axis 28, which as noted above, is co-axial with the longitudinal axis of the piston rod 32 and the cylinder 16.

In use, the rear axial surface 68 is intended to be exposed to the relatively high pressure gas and oil in the expansion chamber 44 of the cylinder 16. The front axial surface 72 is intended to be exposed to a much lower pressure, such as atmospheric pressure, when the seal 12 is employed in the gas spring 14.

Figure 3:
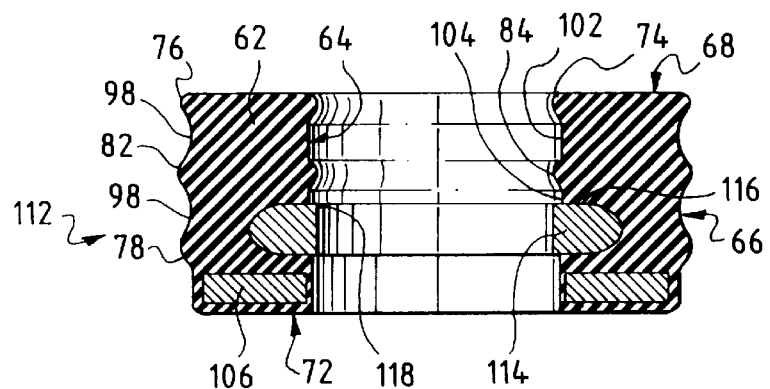
FIG. 3 is an axial cross-sectional view of another embodiment of the improved seal of the present invention.

Referring now to FIG. 3, an improved seal 112 is illustrated. This seal 112 is structurally the same as seal 12 (FIGS. 1 and 2) except as described hereinbelow and a description of the common components (indicated by the same reference numbers as employed in FIGS. 2 and 3) will not be repeated here. More specifically, the sixth lobe 88 has been omitted in seal 112. Instead a plastic insert 114, which is disposed in a recess 116 and which includes a corner edge 118 adjacent the portion 104, is employed in place of the lobe 88. The structure and function of the insert 114 and recess 116 are the same as insert 94 and recess 92 described in our co-pending application Ser. No. 08/730,225, which description as noted above is incorporated herein by reference.

Figure 4:
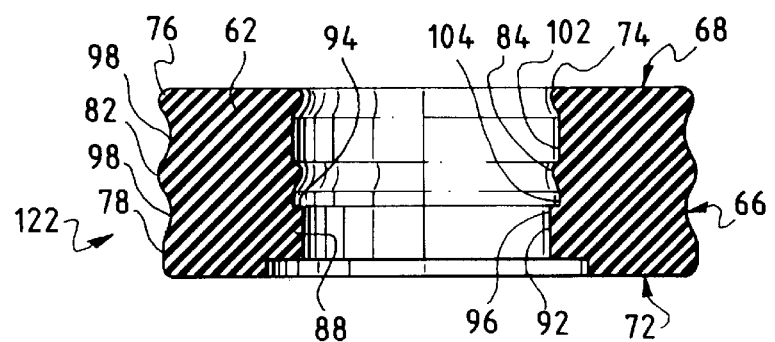
FIG. 4 is an axial cross-sectional view of still another embodiment of the improved seal of the present invention.

Referred to FIG. 4, an improved seal 122 is illustrated. The seal 122 is structurally the same as seal 12 (FIGS. 1 and 2) except as described hereinbelow and a description of the common components (indicated by the same reference numbers as employed in FIGS. 2 and 4) will not be repeated here. More specifically, the seal 122 is structurally like the seal 12 except that no metal plate, like the plate 106, is included in or co-molded with the seal body 62. The omission of a metal plate does not adversely effect the oil sealing effectiveness of the seal 122, and particularly the sealing lobe 88, but does effect the axial gas permeability of the seal body 62 of seal 122. The seal 122 has utility where increased effective seal life is not a major customer requirement as compared to reduced cost.

The OD of the seal body 62 in seals 12, 112 and 122 is selected, vis-à-vis the cylinder 16 in which the seal will be disposed, so that ID of the cylinder is less than the OD of the seal body. When the seal is properly positioned between the rod 32 and cylinder 16, the seal body 62 is compressed between the cylinder and the rod. This compression induces stress, sometimes called installed stress, in the seal body 62. The ID of the seal body 62 is selected so that it is slightly smaller than the OD of the piston rod 32, but the interference or overlap between this OD and ID is relatively minimal so that most of the installed stress induced in the seal body 62 (due to its being disposed between the cylinder and the rod) is caused by the compression of the seal between the cylinder and the rod.

As an improved seal 12, 112 and 122 becomes loaded, both by the installed stress and by the differential pressures acting on its axial surfaces 68 and 72 (that is, by gas loading), the relative interference loads increase differentially as a result of the seal geometries and the properties of the seal body material. That is, tests have shown that there is a high stress loading at and about the lobe 84 and that a resultant force vector is created in the front end of the seal body 62. This force vector extends inwardly from the area of the lobe 78 (in a somewhat generally radial direction) and acts on the lobe 88, or when the insert 114 is used (FIG. 3) on outwardly facing parabolic surface of the insert 114, and more particularly, on that portion of the surface facing the lobe 84. As a result, the lobe 88 or the insert 114 tends to be rotated about its annular axis such that the corner edge 96 of the lobe 88, or the corner edge 118 of the insert 114, is forced tightly against the adjacent OD surface of the rod 32. This serves to wipe oil from the OD of the rod 32, and hence, to minimize the seepage or leakage of the oil past the inwardly facing surface of the lobe 88 or insert 114.

That is not to say, however, that the sealing lobes 74, 76, 78, 82, and 84 do not also prevent leakage of oil from the cylinder 16—as well as preventing the leakage of the high pressure gas. Rather it is the synergistic or synergetic combination of the wiping action of the corner edge of the lobe 88, or the insert 114, taken together with the stressed sealing between the lobes 74 and 84 and the OD of the piston rod 32 and between the lobes 76, 78 and 82 the ID of the cylinder, that creates the extremely effective seal of the present invention. Additionally, the mass of the lobes, and particularly the lobes 78 and 82, not only serves to maintain the installed stress of the seal body 62 longer, but also serves to continue to "feed" lobe 88 or PTFE material in the case of insert 114, at the corner edge 96 or 118, against the OD surface of the rod 32 as the corner edge wears away.

Figure 5:
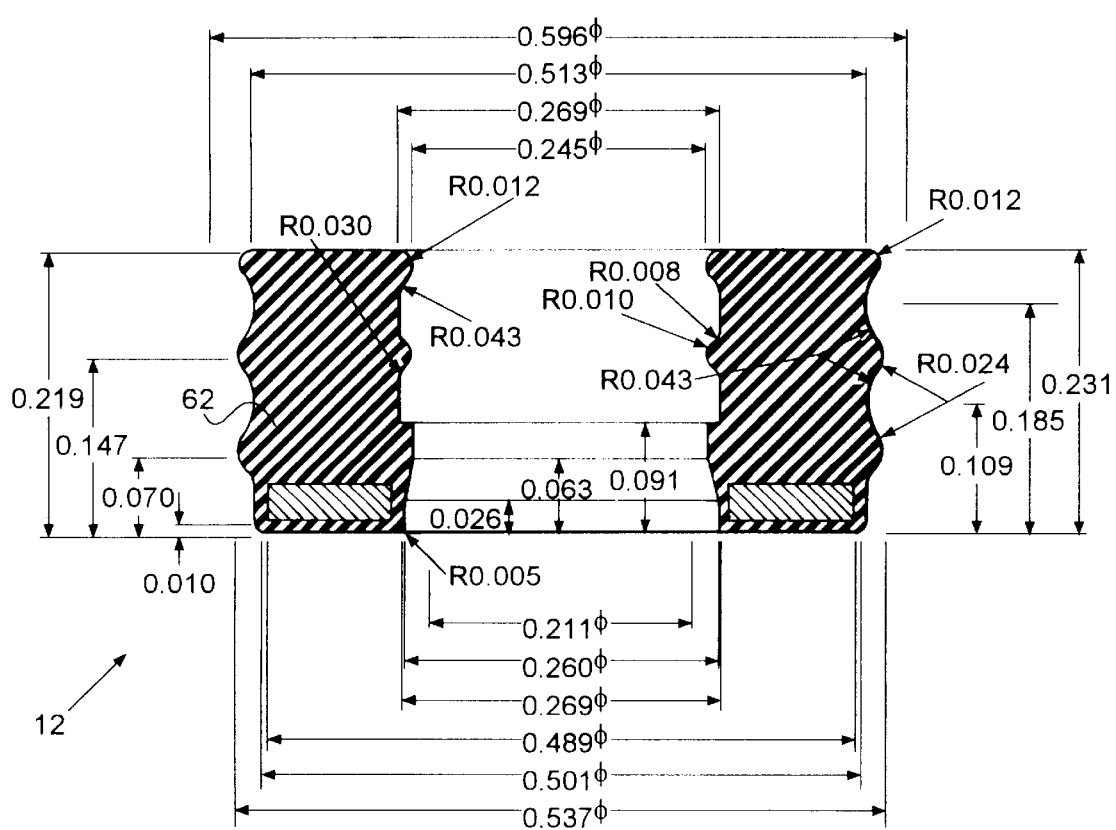
FIG. 5 is a cross-section view, similar to FIG. 2, showing illustrative dimensions of an example of the improved seal.

As an example, FIG. 5 shows illustrative dimensions, in inches, of an embodiment of the seal 12.

In sum, the design (geometry) of the improved seal of the present invention and of the component lobes and surfaces, as described hereinabove, are such that upon the loading of the improved seal (that is, when the seal is compressed between the cylinder 16 and the rod 32 and when the gas spring 14 is charged by the introduction of gas under pressure within the chambers 42 and 44), effective static and dynamic gas and oil seals will be formed between the seal and the cylinder 16 and between the seal and rod 32. Tests and analyses indicate that the seal's effectiveness, particularly with respect to preventing leakage of oil and gas along the rod 32, results because the loading of the seal 12 forces the corner edge 98 or 118, respectively, against the adjacent OD surface of the rod 32. More specifically, the loading of the seal 12 causes a resultant force vector to act upon the lobe 88 or the insert 114 so as to urge the corner edge 98 or 118 against and into sealing contact with the OD of the rod 32.

Another significant advantage of the improved seal of the present invention is the inclusion of the metal plate or washer 106 within the seal body 62. Not only does this plate 106 increase the effective life of the seal by minimizing axial gas permeation through the body 62, but also the plate 106 provides significant mechanical stability for the seal structure and minimizes the nibbling of the seal material, adjacent the rod end of the seal. This latter advantage is achieved without the additional cost of handling and assembling a separate washer as was previously done when separate washers were used with quad seals.

What is claimed is:

1. An improved seal adapted to prevent leakage of relatively high pressure gas and lubricating oil such as in the closed end of the cylinder of a gas spring having an annularly spaced, axially relatively movable cylinder and piston rod, where the piston rod extends out of rod end of the cylinder and where the improved seal will be disposed for sealing between the relatively movable cylinder and piston rod so as to minimize the leakage of the relatively high pressure gas and the lubricating oil out of the rod end of the gas spring, the seal having:

a generally annular, non-symmetrical seal body that is made of a molded elastomeric material, that has a longitudinal axis which is adapted to be disposed generally parallel to the axis of movement of the piston rod and cylinder, and that includes: a first, generally radially inwardly facing surface, which is adapted to be disposed about and in sealing contact with a radially outwardly facing surface on the piston road of the gas spring; a second, generally radially outwardly facing surface, which is adapted to be disposed within and in sealing contact with a radially inwardly facing surface on the cylinder of the gas spring; a third, generally axial facing surface, which is adapted to face the closed end of the gas spring cylinder and which is adapted to be exposed to the relatively high pressure gas in the gas spring cylinder; and a fourth generally axial facing surface which is adapted to face the rod end of the gas spring cylinder and which is adapted to be exposed to a relatively lower pressure;

the seal body also having a first generally annular enhanced force directing and sealing lobe that is disposed at the intersection of the first and third surfaces; a second generally annular enhanced force directing and sealing lobe that is disposed at the intersection of the second and third surfaces; a third generally annular enhanced force directing and sealing lobe that is disposed adjacent to the intersection of the second and fourth surfaces; a fourth generally annular enhanced forced directing and sealing lobe that is disposed in the second surface between the second lobe and third lobe; and a fifth generally annular enhanced force directing and sealing lobe in the first surface that is disposed between the planes of the third and fourth axial surfaces; a generally annular portion that is in the first surface between the fifth lobe and the fourth axial surface and that is adapted to serve as a reservoir for oil, which may tend to migrate from the closed end of the gas spring cylinder along the first surface of the seal body when the seal body is disposed about and in sealing contact with the radially outwardly facing surface on the gas spring piston rod and is adapted to be disposed within and in sealing contact with the radially inwardly facing surface on the gas spring cylinder; and means for minimizing leakage of oil between the first surface of the seal body and the radially outwardly facing surface on the gas spring piston rod, with the oil leakage minimizing means being disposed between the generally annular portion and the fourth axial surface and including a first edge that projects radially inwardly beyond the plane of the first surface of the seal body, with the first edge of the oil leakage minimizing means being adjacent to the generally annular portion; with the first lobe and the fifth lobe projecting radially inwardly; with the second lobe, the third lobe and the fourth lobe projecting radially outwardly; with the first, second, third, fourth and fifth lobes having preselected sizes and shapes for inducing and directing a force in a preselected direction in the seal body when the seal body is disposed about and is in sealing contact with the radially outwardly facing surface on the gas spring piston rod and is disposed within and is in sealing contact with the radially inwardly facing surface on the gas spring cylinder; with the preselected sizes and shapes of the first, second, third, fourth and fifth lobes, together with the compression of the seal between the gas spring cylinder and the piston rod and the gas loading on the seal body, causing net resultant forces to act on the seal body such that the first edge of the oil leakage minimizing means will bear against the radially outwardly facing surface of the gas spring piston rod so as to minimize leakage of oil between the first edge and the radially outwardly facing surface of the piston rod; with the seal body having an annular metal plate disposed therein adjacent to the rod end of the seal body, so as to minimize the permeation of gas axially through the seal body; with the metal plate having an annular dimension, in a radial plane that is substantially the same as, but slightly less than the annular dimension, in the radial plane, of the seal body; and with the metal plate being disposed between the fourth axial surface of the seal body and the oil leakage minimizing means.

2. The gas spring of claim 1 wherein the seal body has a generally annular recess opening in the first surface adjacent to the intersection of the planes of the first and fourth surfaces; and wherein the oil leakage minimize means includes a relatively flowable plastic, generally annular insert that is disposed in the recess, with the insert having a generally radially outwardly facing surface, having a first axial facing surface that faces the third axial surface of the seal body, having a radially inwardly facing surface, and having a first corner edge, which is defined by the intersection of the planes of the first axial surface and the inwardly facing surface of the insert and which is disposed radially inwardly beyond the plane of the first surface of the seal body.

3. The improved gas spring of the claim 1 wherein the oil leakage minimizing means includes a sixth, generally annular sealing lobe that is in the first surface of the seal body between the annular portion and the plane of the fourth axial surface of the seal body; and wherein the sixth lobe includes an axially extending portion having a radially inwardly facing surface, a first generally axially facing surface that faces toward the third axial surface of the seal body, and a first corner edge that is defined by the intersection of the planes of the first axial surface and the inwardly facing surface of the sixth lobe; and wherein the first corner edge of the sixth lobe is disposed radially inwardly beyond the plane of the first surface of the seal body.

4. The improved gas spring of claim 2 wherein the metal plate is co-molded with the seal body and is disposed between the fourth axial surface of the seal body and the radial plane of the insert.

5. The improved gas spring of claim 3 wherein the metal plate is co-molded with the seal body and is disposed between the fourth axial surface of the seal body and the radial plane of the corner edge of the sixth lobe.

6. In a gas spring having an annularly spaced, axially relatively movable cylinder and piston rod, which gas spring contains relatively high pressure gas and lubricating oil in the closed end of the cylinder and from which the piston rod extends out of rod end of the cylinder, the improvement comprising a seal for sealing between the relatively movable cylinder and piston rod so as to minimize the leakage of the relatively high pressure gas and the lubricating oil out of the rod end, the seal having:

a generally annular, non-symmetrical seal body that is made of a molded elastomeric material, that has a longitudinal axis generally parallel to the axis of movement of the piston rod and cylinder, and that includes: a first, generally radially inwardly facing surface, which is disposed about and in sealing contact with a radially outwardly facing surface on the piston rod of the gas spring; a second, generally radially outwardly facing surface, which is disposed within and in sealing contact with a radially inwardly facing surface on the cylinder of the gas spring; a third, generally axial facing surface, which faces the closed end of the cylinder and which is to be exposed to the relatively high pressure gas in the gas spring cylinder; and a fourth generally axial facing surface which faces the rod end of the cylinder and which is to be exposed to a relatively lower pressure;

the seal body also having a first generally annular enhanced force directing and sealing lobe that is disposed at the intersection of the first and third surfaces; a second generally annular enhanced force directing and sealing lobe that is disposed at the intersection of the second and third surfaces; a third generally annular enhanced force directing and sealing lobe that is disposed adjacent to the intersection of the second and fourth surfaces; a fourth generally annular enhanced forced directing and sealing lobe that is disposed in the second surface between the second lobe and third lobe; and a fifth generally annular enhanced force directing and sealing lobe in the first surface that is disposed between the planes of the third and fourth axial surfaces; a generally annular portion that is in the first surface between the fifth lobe and the fourth axial surface and that may serve as a reservoir for oil, which may tend to migrate from the closed end of the gas spring cylinder between the first surface of the seal body and the radially outwardly facing surface on the piston rod when the seal body is disposed about and in sealing contact with the radially outwardly facing surface on the piston rod and is disposed within and in sealing contact with the radially inwardly facing surface on the cylinder; and means for minimizing leakage of oil between the first surface of the seal body and the radially outwardly facing surface on the piston rod, with the oil leakage minimizing means being disposed between the generally annular portion and the fourth axial surface and including a first edge that projects radially inwardly beyond the plane of the first surface of the seal body, with the first edge of the oil leakage minimizing means being adjacent to the generally annular portion; with the first lobe and the fifth lobe projecting radially inwardly; with the second lobe, the third lobe and the fourth lobe projecting radially outwardly; with the first, second, third, fourth and fifth lobes having preselected sizes and shapes for inducing and directing a force in a preselected direction in the seal body when the seal body is disposed about and is in sealing contact with the radially outwardly facing surface on the piston rod and is disposed within and is in sealing contact with the radially inwardly facing surface on the cylinder; and with the preselected sizes and shapes of the first, second, third, fourth and fifth lobes, together with the compression of the seal between the cylinder and piston rod and the gas loading on the seal body, causing net resultant forces to act on the seal body such that the first edge of the oil leakage minimizing means will bear against the radially outwardly facing surface of the piston rod so as to minimize leakage of oil between the first edge and the radially outwardly facing surface of the piston rod; with the seal body having an annular metal plate disposed therein adjacent to the rod end of the seal body so as to minimize the permeation of gas axially through the seal body; with the metal plate having an annular dimension, in a radial plane, that is substantially the same as, but slightly less than the annular dimension, in the radial plane of the seal body; with the plane, of the metal plate being generally parallel to a radial plane through the seal body; and with the metal plate being disposed between the fourth axial surface of the seal body and the oil leakage minimizing means.

7. The improved gas spring of claim 6 wherein the seal body has a generally annular recess opening in the first surface adjacent to the intersection of the planes of the first and fourth surfaces; and wherein the oil leakage minimize means includes a relatively flowable plastic, generally annular insert that is disposed in the recess, with the insert having a generally radially outwardly facing surface, having a first axial facing surface that faces the third axial surface of the seal body, having a radially inwardly facing surface, and having a first corner edge, which is defined by the intersection of the planes of the first axial surface and the inwardly facing surface of the insert and which is disposed radially inwardly beyond the plane of the first surface of the seal body.

8. The improved gas spring of the claim 6 wherein the oil leakage minimizing means includes a sixth, generally annular sealing lobe that is in the first surface of the seal body between the annular portion and the plane of the fourth axial surface of the seal body; and wherein the sixth lobe includes an axially extending portion having a radially inwardly facing surface, a first generally axially facing surface that faces toward the third axial surface of the seal body, and a first corner edge that is defined by the intersection of the planes of the first axial surface and the inwardly facing surface of the sixth lobe; and wherein the first corner edge of the sixth lobe is disposed radially inwardly beyond the plane of the first surface of the seal body.

9. The improved gas spring of claim 7 wherein the metal plate is co-molded with the seal body and is disposed between the fourth axial surface of the seal body and the radial plane of the insert.

10. The improved gas spring of claim 8 wherein an annular metal plate is disposed in the seal body, adjacent to the rod end of the seal body so as to minimize the permeation of gas axially through the seal body.

11. The improved gas spring of claim 8 wherein the metal plate is co-molded with the seal body and is disposed between the fourth axial surface of the seal body and the radial plane of the corner edge of the sixth lobe.

12. The improved gas spring of claim 5 wherein the seal body has a generally annular recess opening in the first surface adjacent to the intersection of the planes of the first and fourth surfaces; and wherein the oil leakage minimize means includes a relatively flowable plastic, generally annular insert that is disposed in the recess, with the insert having a generally radially outwardly facing surface, having a first axial facing surface that faces the third axial surface of the seal body, having a radially inwardly facing surface, and having a first corner edge, which is defined by the intersection of the planes of the first axial surface and the inwardly facing surface of the insert and which is disposed radially inwardly beyond the plane of the first surface of the seal body.

13. The improved gas spring of claim 1 wherein the metal plate is co-molded with the seal body and is disposed between the fourth axial surface of the seal body and the radial plane of the insert.

14. The improved gas spring of claim 11 wherein the seal body has a generally annular recess opening in the first surface adjacent to the intersection of the planes of the first and fourth surfaces; and wherein the oil leakage minimize means includes a relatively flowable plastic, generally annular insert that is disposed in the recess, with the insert having a generally radially outwardly facing surface, having a first axial facing surface that faces the third axial surface of the seal body, having a radially inwardly facing surface, and having a first corner edge, which is defined by the intersection f the planes of the first axial surface and the inwardly facing surface of the insert and which is disposed radially inwardly beyond the plant of the first surface of the seal body.

15. The improved gas spring of claim 10 wherein the metal plate is co-molded with the seal body and is disposed between the fourth axial surface of the seal body and the radial plane of the corner edge of the sixth lobe.

* * * * *